Sept. 8, 1964  C. L. HORNBERGER ET AL  3,147,985

DRIVING CHUCK

Filed Aug. 28, 1961

INVENTORS
CLARENCE L. HORNBERGER
HARRY F. PRENTICE by George L. Herr

United States Patent Office 3,147,985
Patented Sept. 8, 1964

3,147,985
DRIVING CHUCK
Clarence L. Hornberger, Manheim Township, Lancaster County, and Harry F. Prentice, Lancaster Township, Lancaster County, Pa., assignors to Armstrong Cork Company, Lancaster, Pa., a corporation of Pennsylvania
Filed Aug. 28, 1961, Ser. No. 134,454
3 Claims. (Cl. 279—106)

This invention relates to a driving chuck, and more particularly to a driving chuck which will impart rotary motion to a spindle carrying a relatively heavy roll of sheet material.

In the manufacture of continuous lengths of sheet material such as linoleum and plastic floor and wall covering, it is necessary to place steel spindles containing relatively large quantities of this sheet material in roll form and in driving chucks to either unroll the material from the spindle or roll it onto the spindle in the various manufacturing processes. In the past it has been common practice to utilize a chuck which conforms to three sides of the square end on the spindle. This necessitated a considerable degree of manipulation on the part of the individual operating the hoist or crane carrying the spindle into position because the driven chuck had to be rotated so that the open side of this U-shaped three-sided opening is up. Another disadvantage from this arrangement was derived from the fact that the three sides of the spindle square end were received within the rotating part of the driving chuck, and the spindle was held in this position by means of a pressure-applying portion of the slip ring which engaged only one side of the square end of the spindle. With this type of arrangement, when the device was rotated at relatively high speeds the spindle would tend to move around within this U-shaped pocket in the driving member causing increased wear on the equipment and setting up vibrations in the equipment.

In order to overcome the objections expressed above, the chuck of this invention was developed and perfected so that it is only necessary to rotate the driving member of the chuck with its V-shaped opening upward, and if the square end of the spindle is dropped into this V-shaped opening, it will automatically orient itself to be pocketed within the pocket in the face of the driving member. The slip ring is then placed in position over the driving member, and the clamping arrangement is such that the other two sides of the square-ended shaft are clamped firmly into engagement with the entire assembly so as to prevent any movement during the operation of the device.

It is an object of this invention to provide a chuck which will clamp a spindle firmly in position and which requires very little manipulation to place a spindle in clamping position within the chuck.

Figure 1:
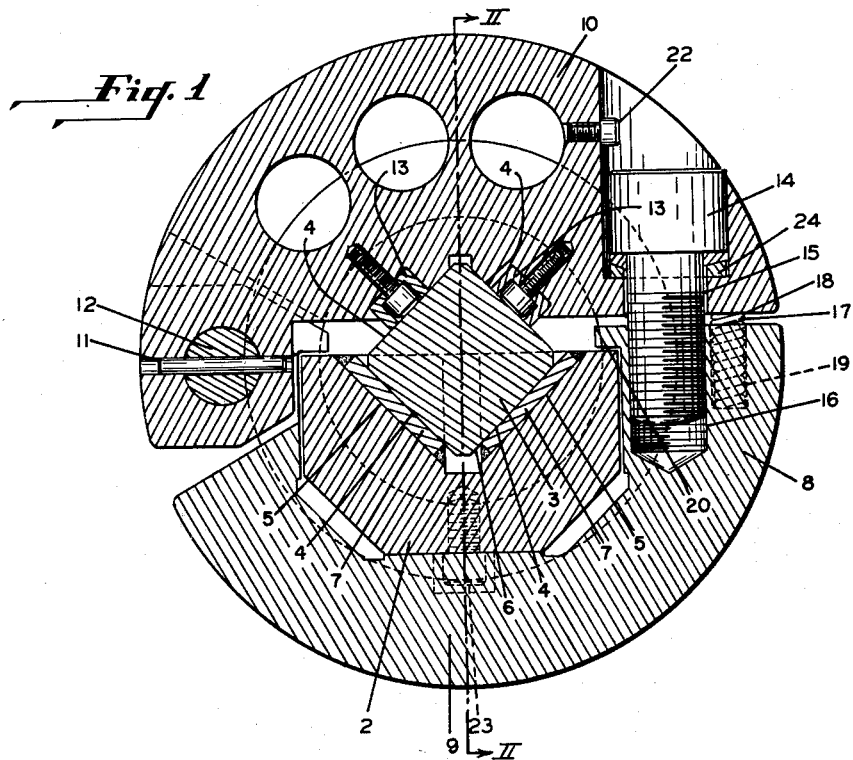
Figure 2:
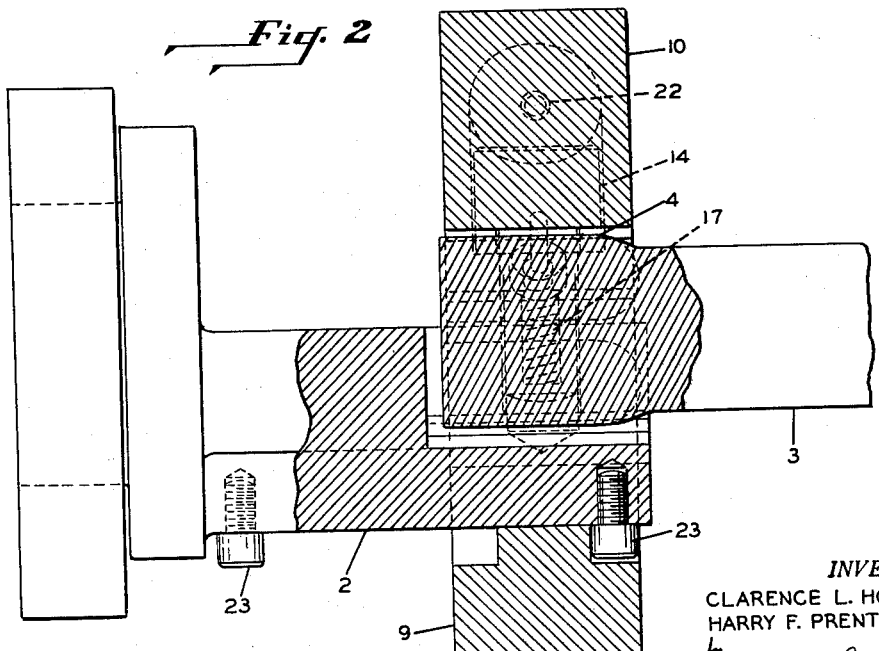

In order that this invention may be more readily understood, it will be described in connection with the attached drawing in which FIG. 1 is a cross-sectional view of a chuck of this design, and FIG. 2 is a view on the line II—II of FIG. 1.

Referring to FIG. 1, there is shown a chuck comprising a rotating driving element 2 having a spindle 3 positioned thereon. This spindle 3 has four sides 4 forming a square end for driving purposes. The chuck has two inclined surfaces 5 disposed at 90° with respect to one another forming a pocket designated generally at 6. The two sides of this pocket are preferably lined with hardened steel plates 7 to eliminate wear on the assembly.

Surrounding the shaft which carries the rotatable driving element 2 is a slip ring 8 formed in two sections. The section which surrounds the driving element 2 is designated by the numeral 9, and the top or hinged section 10 is in juxtaposition with the section 9. The slip ring sections are hinged at point 11 by the hinge pin 12. The top part of the slip ring 10 is provided with two pressure pads 13 which are carried on sloping sides of the member 10 which form an inverted pocket for the reception of the other two sides of the square-sided spindle 3. These pressure pads 13 are disposed at 90° with respect to one another and together with the two surfaces 5 of the driving element 2 define a square opening for the reception of the square end of the spindle 3. When the slip ring 8 is placed in clamping position over the spindle, it is tightened thereon by means of the cap screw 14 which passes through an opening 15 in the member 10 and is in threaded engagement in the opening 16 in the member 9. When the cap screw 14 is rotated for loosening purposes, the slip ring automatically opens a slight distance by reason of the spring 17 which is compressed between the surface 18 of the section 10 and the pocket 19 in the section 9. In order to insure that the top section 10 releases its pressure on the spindle 3 there is provided a supporting lip 20 on the bottom section 9. This lip is so positioned as to engage the driving element 2 immediately after cap screw 14 starts to back off. This arrangement insures the maintenance of a constant relationship between the driving element 2 and the lower section 9 of the slip ring 8. Continued backing off of the cap screw 14 causes the spring 17 to actually lift the section 10 and relieve the pressure from the top two sides of the square end of the spindle 3. The extent of travel of the cap screw 14 in backing off is limited by the stop screw 22 positioned in alignment with the top of the cap screw 14. The lateral movement of the slip ring 8 is limited by the stop screws 23 located on the driving element 2.

In the operation of this device the slip ring 8 is moved away from its position over the V-shaped pocket 6 in the driving element 2 until it engages the stop screw 23. The drive means for driving the driving element 2 is manipulated so that the vertex of the 90° angle formed by the two surfaces 5 is in a down position as shown generally in FIG. 1. When in this position the spindle 3 is lowered into position with the square end of the spindle in alignment with the pocket 6 of the driving element 2. As the spindle is lowered into position, if the two sides are not properly oriented to fit in the pocket 6 they will automatically orient themselves upon the application of downward pressure against the pocket. With the spindle in this position the slip ring 8 is slipped over the driving element 2 with the square end of the spindle in position. During such sliding action the top section 10 of the slip ring will clear the spindle by reason of the fact that the spring 17 pushes this section away from the bottom section. The bottom section 9 is retained in close proximity in the driving element 2 by the supporting lip 20 which slides on the surface of the driving element. The cap screw 14 is screwed down compressing the spring 17 between the surface 18 and the pocket 19 urging the pressure pads 13 into tight engagement with the two sides of the square end of the spindle opposite those which engage the surfaces 5 on the driving element 2. Washers 24 are provided beneath the head of the cap screw 14 to insure a proper seat for the head when the arrangement is in clamping position. When it is necessary to remove the spindle the cap screw 14 is loosened, the spring 17 pushes the top section 10 away from the sectioon 9 hinging it about the hinge pin 12 until pressure is released against the spindle 3. When the pressure is released the slip ring can be slid lengthwise along the spindle until the square end of the spindle is clear and can be lifted upwardly without engaging the slip ring. While in this position the spindle is removed, and the operation can be repeated.

It will be clear from this description that we have developed a device in which the square end of a spindle can be easily inserted without encountering the difficult and hazardous task of the prior art structures.

We claim:

1. A driving chuck for a spindle, the elements comprising a driving element having a V-shaped pocket to engage a portion of a 4-sided spindle, a slip ring to slide over said driving element and the portion of said spindle which engages said pocket, said slip ring being formed of two parts, one conforming to the shape of the driving element and the other conforming to the V-shaped portion of the spindle disposed opposite that portion engaged by the driving element, the two sections of said slip ring being hingedly attached at one side of the spindle and secured together by means of a clamping member at the opposite side to clamp the spindle in position therein.

2. A driving chuck for engagement with a spindle to drive the same, the elements comprising a driving element having a V-shaped pocket to engage a portion of a 4-sided spindle, a slip ring adapted to slide on said driving element to extend over that portion engaged by the spindle, said slip ring being formed of two parts, one conforming to the shape of the driving element and the other conforming to the V-shaped portion of the spindle engaged by the driving element, the two sections of said slip ring being hingedly attached at one side of the spindle and secured together by means of a clamping member at the other side to clamp the spindle in position in engagement with the driving element.

3. A driving chuck for a spindle, the elements comprising a driving element having a V-shaped pocket to engage a portion of a 4-sided spindle, the V-shape of said pocket conforming to two sides of the driven end of said spindle, a slip ring adapted for sliding movement in engagement with said driving element, said slip ring surrounding said driving element and being formed of two parts, one conforming to the shape of the driving element and the other conforming to that partion of the spindle opposite the driving element, the two sections of said driving element being hingedly attached at one side of the spindle and secured together by means of a clamping member at the other side to clamp the spindle in position therein, and resilient means to urge said sections apart when said clamping member is released.

References Cited in the file of this patent

UNITED STATES PATENTS

| | | |
|---|---|---|
| 2,231,252 | Chesterman | Feb. 11, 1941 |
| 2,735,684 | Longee | Feb. 21, 1956 |
| 2,954,182 | Bojanower | Sept. 27, 1960 |